July 21, 1959 T. O. RUEB 2,895,222
TAPER GAGE
Filed Sept. 21, 1955 2 Sheets-Sheet 1

Inventor:
Theodore O. Rueb
By Glenn S. Noble
Atty.

July 21, 1959     T. O. RUEB     2,895,222
TAPER GAGE
Filed Sept. 21, 1955     2 Sheets-Sheet 2
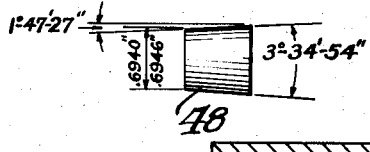
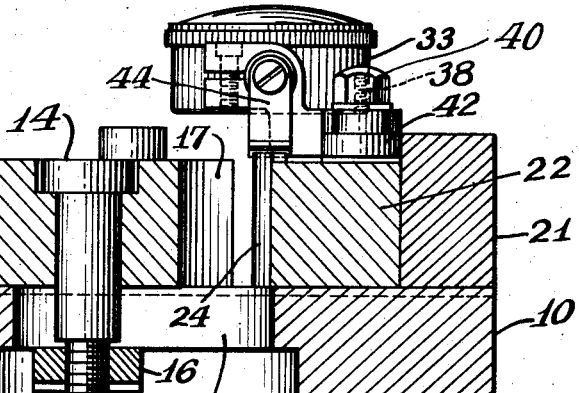
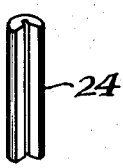
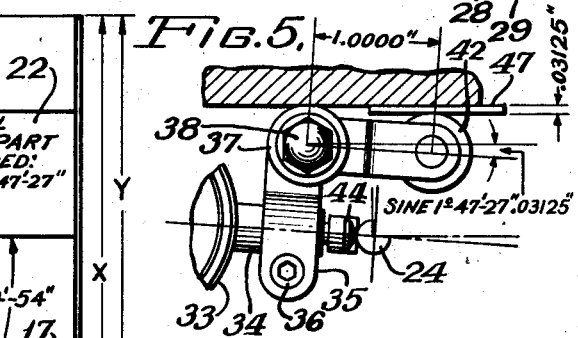
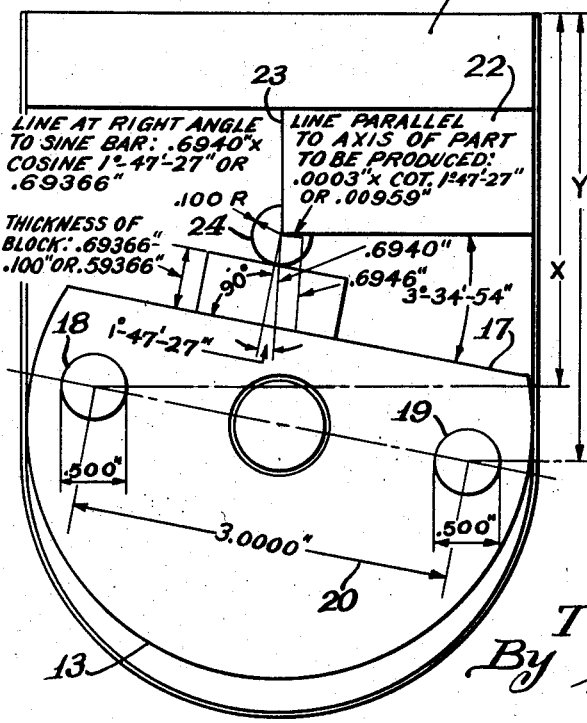
Inventor:
Theodore O. Rueb
By Glenn S. Noble
Atty.

United States Patent Office 2,895,222
Patented July 21, 1959

2,895,222

TAPER GAGE

Theodore O. Rueb, Chicago, Ill.

Application September 21, 1955, Serial No. 535,717

2 Claims. (Cl. 33—75)

This invention relates to gages for use in testing or gaging tapered articles such as tapered pins, plugs or the tapered portions of certain tools or machine elements such as arbors, and the like, and is an improvement on the similar gage shown and described in my Patent No. 2,380,792 patented July 31, 1945.

The objects of this invention are similar to those of the patented device and the mathematical formulas applicable thereto are substantially the same so that they are not repeated herein.

Other objects of the present invention are to provide a true taper gage to check mathematically regardless of its accuracy any specified taper and diameter tolerance of a taper work piece; to provide means for checking out of round condition of the work piece by revolving the piece part or work piece to be checked and observing the movement of the indicator forming a part of the present invention.

This invention provides means for checking tapers which is different from previous methods which generally used "compare to master" method. Such a master has to be made by a gage manufacturer to extreme accuracy and delivery of the same is generally slow, and the operation of checking is that of a laboratory operation.

My invention differs from the others in that it may be set for any close taper piece within a short time such as 15 to 30 minutes, and the gage may be used where the piece is manufactured instead of having to take the part to a laboratory for testing.

My improved gage provides means whereby shops may test a taper arbor or other taper piece in the shop when it would be highly impractical to purchase a ring gage or master gage.

My improved gage may be set in a few minutes to check the part thus made in the shop.

My improved gage is shown in the accompanying drawings in which,

Fig. 3 is a cross sectional view taken substantially on the line 3—3 of Fig. 1.

Fig. 4 is a sectional detail illustrating the method of setting the anvil or work piece support member.

Fig. 5 is a detail showing the method of setting the indicator on the axis of the part to be gaged.

Fig. 6 is a detail showing the method of setting the indicator for minimum tolerance using a .1000 radius center gage.

Fig. 7 is a plan view showing the setting of the sign bar.

Fig. 8 is a perspective view of a center gage or element used in the gaging operation; and Fig. 9 is a side view of the work piece or part to be tested.

Figure 1:
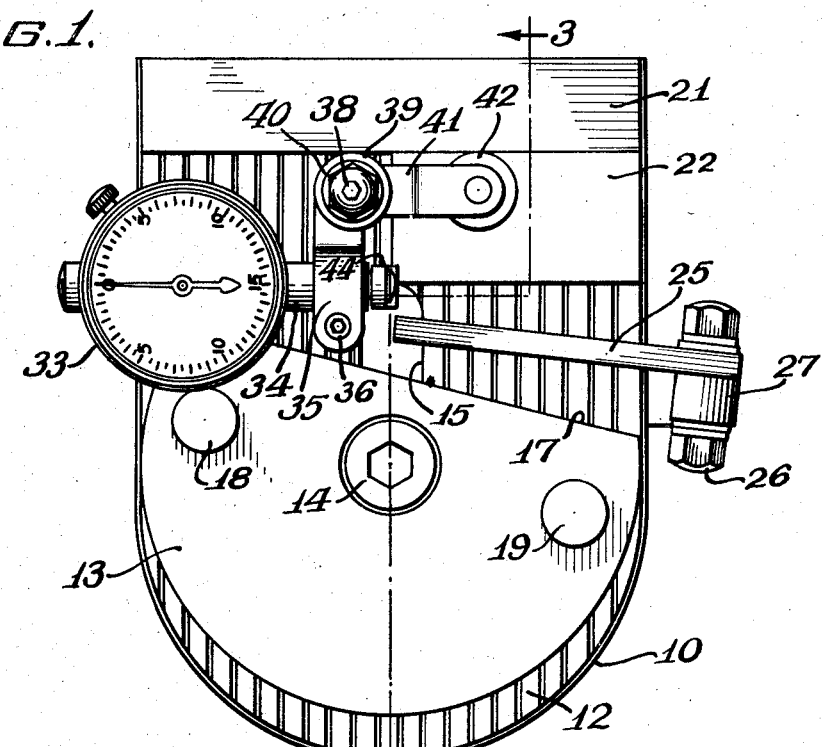
Fig. 1 is a plan view.
Figure 2:
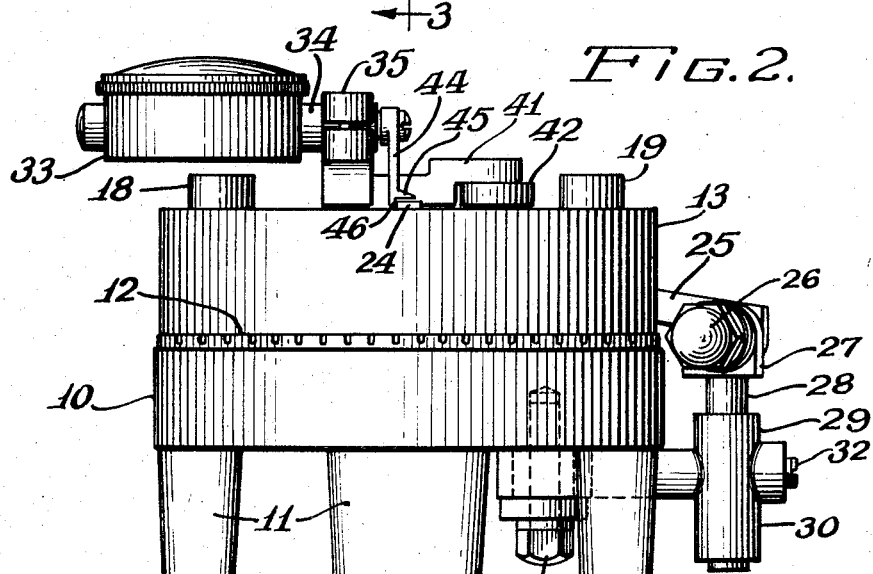
Fig. 2 is a front elevation.

As shown in these drawings, the gage has a base 10 which is supported on legs 11. The base has a top accurately finished surface 12 on which is adjustably supported a segmental disc or block 13 which has its lower face accurately finished for engagement with the bearing surface 12. This block is held in adjusted position by means of a bolt 14 which extends through a longitudinal slot 15 in the base and is held in adjusted positions by means of a nut 16.

The disc or block 13 which functions in the manner of a sine-bar has an accurate face or straight edge 17 which forms one of the gage elements or contact surfaces and also has two hardened round plugs 18 and 19 which are mounted in the disc member in any suitable manner. These plugs are the same diameter and they are spaced apart at a predetermined fixed distance as indicated at 20 which in the present case is assumed as being 3" to facilitate calculations.

The edge or face 17 is parallel with the line through the plug centers. The base or body 10 has an upwardly extending wall 21 which is opposed to the flat face of the sine-bar, which is attached thereto in any suitable manner. A block 22 is attached to the wall 21 and to the base 10 and extends part way across the base with its inner end 23 in alignment with the center of the sine-bar.

The inner corner of this block is provided with a round center rod or bar 24 one-fourth of which is cut away as shown in Fig. 8 so that it fits the corner of the block and serves to protect the corner as well as for more accurate measurements.

In the present instance, this rod has a radius of .100 inch and like all of the other parts of the gage is made with the greatest accuracy.

I also provide an anvil or bar 25 for engagement with the bottom of the work piece 48 and which is mounted for substantially universal movement. It is pivoted at one end on a bolt 26 mounted in a bearing 27 at the top of a vertical shaft 28. The bolt provides for swinging adjustment of the anvil and for fastening it in adjusted positions. The shaft 28 fits in a bearing 29 which forms part of a bracket 30 pivoted on a set screw 31 which engages with the base 10 as shown. The slidable and rotatably adjustable shaft 28 is held in adjusted positions by means of a set screw 32 extending through a lug on the side of the bearing. The method of setting this anvil is shown in Fig. 4 and will be explained later. In order to provide for certain longitudinal adjustments or measurements with respect to the work piece, I utilize a dial indicator 33 of the type used for micrometric measurements. The stem 34 of the indicator is adjustably held in a clamp 35 having a clamping screw 36. This clamp is a portion of a bracket 37 mounted on a set screw 38 at the top of a post 39 extending upwardly from the base 10 adjacent to the end of the block 22.

A nut 40 serves to hold the bracket in adjusted positions as it is rotated on the post. The bracket 37 also has an arm 41 extending outwardly at right angles from the clamp 35 which carries a roller 42 adapted to contact with the inner face of the wall 21 as best shown in Figs. 1 and 5.

The spindle 43 of the indicator carries a downwardly extending arm 44, the lower end of which has a foot 45 with a notch therein providing a projection 46.

In order to illustrate the method of operations in the use of my gage, a part 48 to be produced or tested is shown in Fig. 9 with the dimensions and angles applicable thereto. As shown in this illustration, the small end of the work piece is permitted a tolerance in diameter between .6940" and .6946". The total angle between the side of the work piece is 3°34'54" and the angle of one side is 1°47'27".

In order to set the gage for testing this piece, the rod or bar 24 is positioned at the corner of the block 23 as shown in Fig. 7 and a Johansson block of .59366" in width is inserted between the face of the sine-bar and the rod or bar 24 as shown in Fig. 7, so that the total vertical distance between the face of the sine-bar and the corner of the block 23 will be .69366". The hypotenuse of the small triangle in Fig. 7 is .6940 which is the minimum tolerance allowable and which determines the position of the work piece such as shown in Fig. 9 when it is inserted for testing. It will also be noted that the shortest distance from the corner of the block 22 and the sine-bar is .69366 and subtracting the diameter of the radius of the rod 24 gives the distance .59366. At this time, the sine-bar has been pivoted or adjusted so that the angle between the face of a bar and the face of the block is 3°34'54". The parts are now adjusted for the correct angle and minimum tolerance of the work piece. The longitudinal movement of the work piece along the axis of the same corresponding with the diameter tolerance of the piece part is now figured from the measurements given.

The axis of the indicator is set so that it is parallel to the axis of the work piece as shown in Fig. 5. The foot of the indicator is slid forward against the rod 24 as shown in Fig. 6 while keeping a slight friction in indicator bearing support until the indicator advances slightly, then the support is tightened by means of the indicator bearing screw 36.

The tolerance points on the indicator set are then set to correspond with the lateral movement of the work piece as figured above and the parts are set for tolerance and angle of the work piece.

The anvil must be set as shown in Fig. 4 to keep the axis of the work piece parallel to the gaging edge of the sine-bar and to the top surface of base 12. This is accomplished in part by means of two short standard rods of the same diameter which engage with grooves in the anvil 25. These grooves are accurately spaced one inch apart and the centers of the grooves must be on a line parallel with the face of the anvil.

The anvil is set visually to hold the work part a few thousandths of an inch below the upper surfaces of the sine-bar 13 and block 22.

The distance between the center of the set screw 38 and the center of the roller 42 in the present instance is one inch and the roller is .625" in diameter and the center line of the arm 41 is parallel to the face of the block 22 when in normal position. When the adjustment is to be made, a gage block 47 is inserted between the roller and the face which block is .03125 in thickness and is a sine of the desired angle to bring the center line of the indicator parallel to the axis of the work piece 48 when it is inserted in the gage.

As the work piece is inserted for testing, the inner end engages with the foot 45 of the indicator after the rod 24 is removed and actuates the indicator to indicate the proper tolerance.

I claim:

1. In a taper gage, the combination with a base, of a gage block mounted on the base for engagement with one side of the work piece, a sine-bar pivotally mounted on the base adjacent to the gage block for engagement with the opposite side of the work piece, an anvil engaging the bottom of the work piece to support the same, a bolt to which the anvil is pivoted, a bearing for said bolt, a shaft carrying said bearing, a bearing for said shaft, a bracket carrying the last named bearing which is pivoted to the base and a set screw for supporting the bracket, and means for adjusting the anvil to correspond with the taper of the work piece to be tested.

2. In a taper gage, the combination of a base, a wall extending upwardly from the base, a block secured to the base adjacent to the wall and adapted to engage with one side of the work piece, a sine-bar adjustably mounted on the base for engagement with the opposite side of the work piece, a post adjacent to one side of the block, a bracket pivotally mounted on the post and having a clamp, an indicator having a spindle adjustably mounted in the clamp, said bracket having an arm, a roller mounted on the arm for engagement with the face of the wall, and an arm extending downwardly from the spindle of the indicator and having a notched foot for engagement with the end of the work piece.

References Cited in the file of this patent

UNITED STATES PATENTS

| | | |
|---|---|---|
| 1,422,161 | Woodrow | July 11, 1922 |
| 2,359,018 | Balk | Sept. 26, 1944 |
| 2,380,792 | Rueb | July 31, 1945 |
| 2,412,569 | Dugger | Dec. 17, 1946 |
| 2,417,150 | Berry | Mar. 11, 1947 |

FOREIGN PATENTS

| | | |
|---|---|---|
| 683,177 | Great Britain | Nov. 26, 1952 |